UNITED STATES PATENT OFFICE.

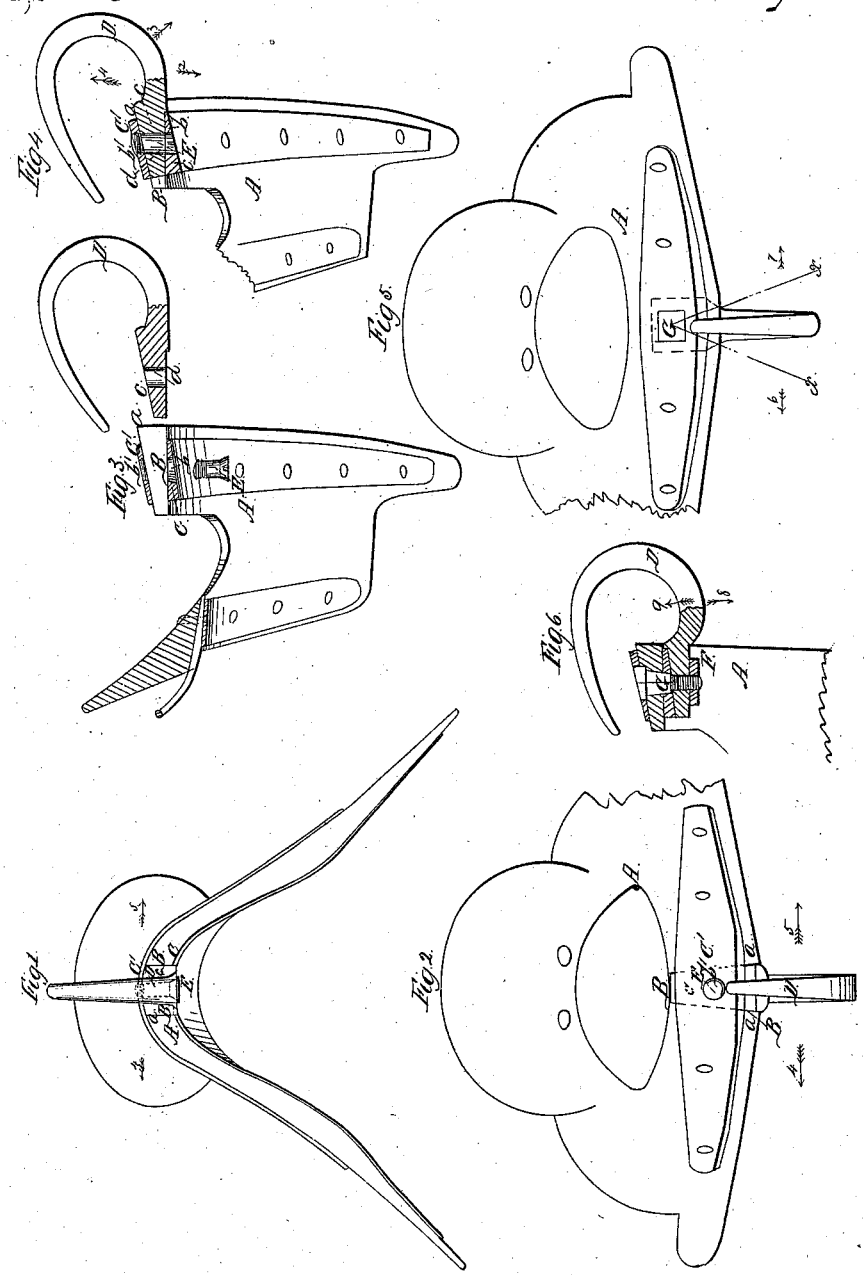

GEORGE B. AMBLER, OF TRUMBULL, CONNECTICUT.

WOODEN SADDLETREE.

Specification of Letters Patent No. 12,891, dated May 22, 1855.

*To all whom it may concern:*

Be it known that I, GEORGE B. AMBLER, of Trumbull, in the county of Fairfield and State of Connecticut, have invented a new and useful Improvement in the Method of Securing the Gullet Hook to Wood Saddletrees; and I do hereby declare that the following is a full, clear, and exact description of the same, reference being had to the accompanying drawings, forming part of this specification, in which—

Figure 1, is a front view of a wood saddle tree with the gullet hook secured to it after my invention. Fig. 2, is a plan or top view of the same. Fig. 3, is a vertical longitudinal section showing the parts ready to be put together. Fig. 4, is a similar section showing the parts united and screwed together. Fig. 5, is a plan of a wood tree with the gullet hook secured to it after the old method. Fig. 6, is a longitudinal section of the same.

Similar letters of reference in each of the several figures indicate corresponding parts.

This invention relates solely to wood trees of harness saddles and is designed to obviate several defects in the same, resulting from the manner in which the gullet hooks are secured to them.

The nature of my invention consists in providing an open slot in the head of the tree to receive the flat end of the gullet hook and also in connection therewith providing a screw thread in the bolt hole of the upper strengthening strap for firmly holding in place the screw bolt which passes through and secures the gullet hook to the head of the tree. By thus securing the gullet hook and having its flat part form as it were part of the tree head itself and its top and bottom stand even with the upper and under surfaces of the tree head, instead of placing the gullet hook under the head and confining it by a nut I am enabled to add lightness and symmetry to the appearance of the front part of the saddle, also to lessen the liability of the gullet hook working loose and turning and likewise in a measure remove the strain from the screw bolt and distribute it equally upon the tree and bolt.

To enable others to fully understand and make my invention I will proceed to describe it more minutely.

A, Figs. 1, 2, 3, and 4, represents an ordinary wood tree having my invention applied to it.

B, is the open slot which I provide in the head *a*, of the same, this slot is formed by cutting out the central portion of the head as shown in the several figures.

C, C', are the front strengthening straps placed on top and underneath the tree as shown, and *b*, *b'*, are bolt holes formed in the same, the hole *b*, formed in the upper strap C', is tapped so that it shall serve as a nut. D, is the gullet hook, its flat end *c*, may be made of taper shape so as to wedge into the slot B, as shown in Fig. 2. *d*, is a bolt hole in the gullet hook, corresponding to those *b*, *b'*.

E, is the screw bolt for securing the gullet hook in the slot B, as shown in Fig. 4.

Owing to the straps C, C', being arranged above and under the slot they prevent the gullet hook having play in the direction of the arrows 1, 2 and 3, and owing to the sides of the end *c*, of the gullet hook coming against the sides of the slot the said hook is prevented from having lateral play in the direction of the arrows 4 and 5. Whereas, owing to the gullet hook in the wood tree shown in Figs. 5, and 6, being simply held in place by a nut and screw, F, G, it has a chance to get loose and play up and down as indicated by the arrows 8 and 9, and also to play laterally, as shown by the arrows 6 and 7 and illustrated by the red lines in Fig. 5.

By comparing the head of the tree shown in Figs. 1, 2, 3 and 4, with that shown in Figs. 5 and 6 the manner in which I am enabled to add lightness and symmetry to the appearance of the front portion of wood saddle trees will be evident. It is by avoiding the necessity of placing the gullet hook under the head of the tree and of confining it with a nut that I am enabled to secure the last named advantage, and it is owing to the nut not being used and the gullet hook not being placed under the tree that I am enabled to make the straps thicker and thus strengthen the tree without giving it a bulky appearance; this arrangement also avoids the necessity of using so stout a bolt, as it equally distributes the strain, owing to this the straps are not weakened to such an extent by the forming of the bolt holes. The horse's back is also saved from being chafed and injured by not using the bolt and nut.

Notwithstanding my invention cannot be applied to metal trees, nor the invention hereinafter adverted to made to take its place on wooden trees, it is deemed necessary to state the difference between it and the metal tree patented in 1848, by A. H. Garzley. In Garzley's tree the upper plate forms with the jockeys to which it is attached the seat of the saddle, and is held in its place by means of the terrets and a projection cast on it which secures and prevents the gullet hook from drawing forward. By this arrangement the tightness with which the hook is held in place depends entirely upon the firmness with which the upper plate is secured to the lower one, if that by any means works loose, the gullet hook is also loosened by the same means, it then of course has more or less play and with the action of the horse's head upon the check rein, wears away to such an extent that it finally fails or breaks and the saddle is then useless, unless the old tree is ripped out and a new one put in its place. One of the most common causes of the gullet hook getting loose results from the manner in which the harness is handled in being taken off or put on a horse. The terret generally being laid hold of, it being most natural and convenient to lay hold of this part as it balances even in the hand and can be kept clear of the dirt or ground and is also the cleanest if the horse has become sweaty; thus handling a harness works the terret and it turns easy and becomes a little loose which is added to in Garzley's tree by the check rein acting upon the hook as a lever and constantly prying against the terrets. In constructing a leather seat upon Garzley's tree, the saddle maker is incommoded from the gullet hook necessarily being kept in between the plates while he works upon it, it being impossible to insert the hook after the saddle is made owing to the projection which confines the hook being in the way. By constructing a tree with a clear space between the two plates of iron, and securing the hook with a screw the harness maker can have the hook removed while making the saddle upon it, and thus not be incommoded thereby as he stretches and shapes the leather upon it. The saddler is also enabled to suit the taste of his customer with either a plated, brass, or japanned hook, even after the harness is finished as the hook already in can be taken out and another inserted in its place, and in case of breakage it also presents the same facility for putting in a new one without ripping or cutting the harness.

What I claim as new and desire to secure by Letters Patent, is—

Providing the slot B, in the center of the head of a wood saddle tree and the screw thread in the top strap C', said slot serving to receive the end c, of the gullet hook, and the screw thread serving to firmly hold the screw, substantially as and for the purposes set forth.

GEORGE B. AMBLER.

Witnesses:
AUGUSTUS R. MARSHALL,
GEO. S. SANFORD.